Oct. 26, 1971 C. E. MUNOZ 3,615,159
METHOD AND APPARATUS FOR CHANGING GAS
FITTINGS, METERS AND THE LIKE
Filed Nov. 12, 1968 3 Sheets-Sheet 2
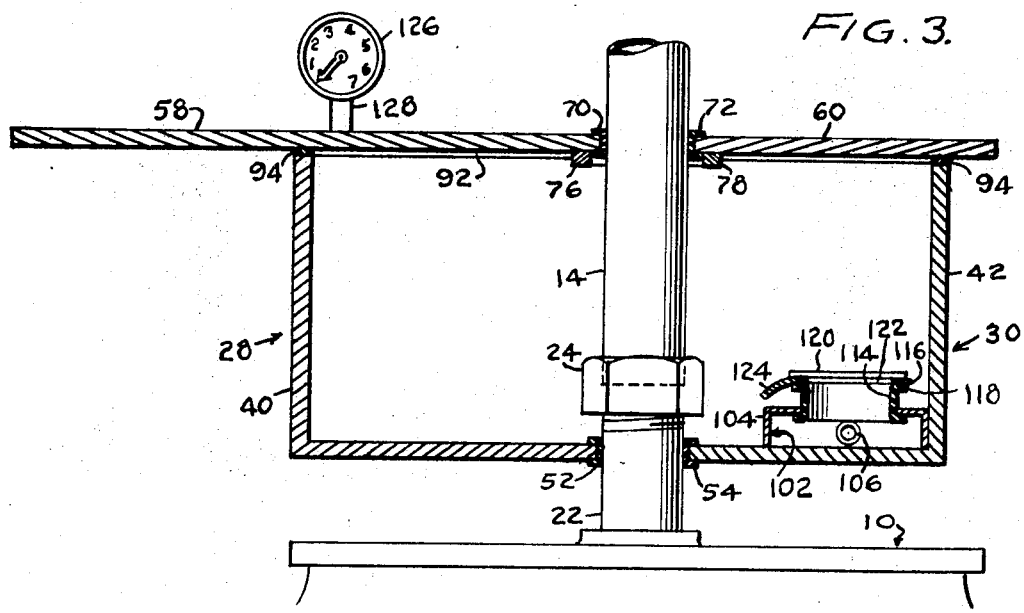
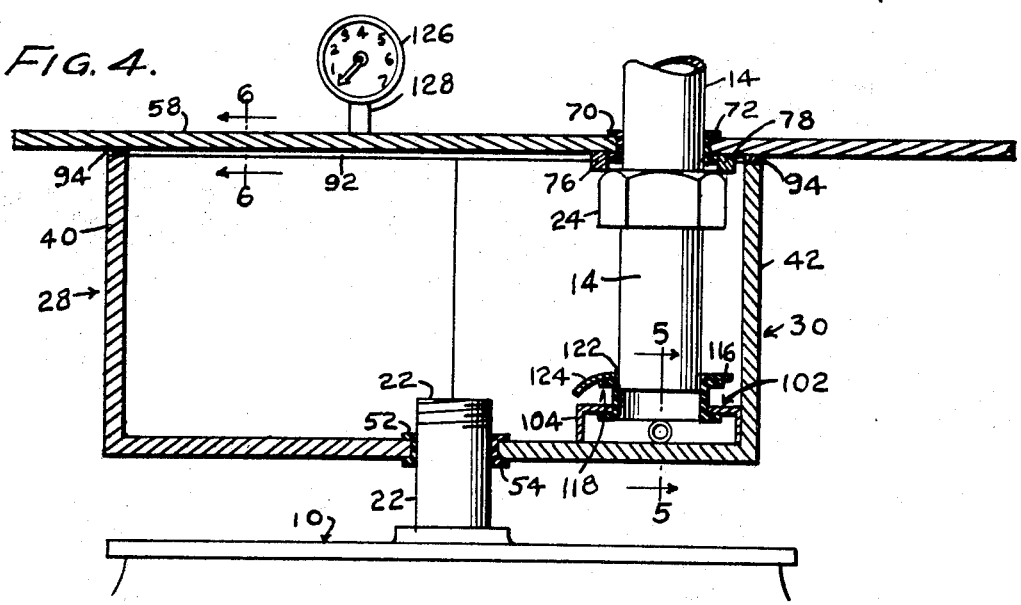
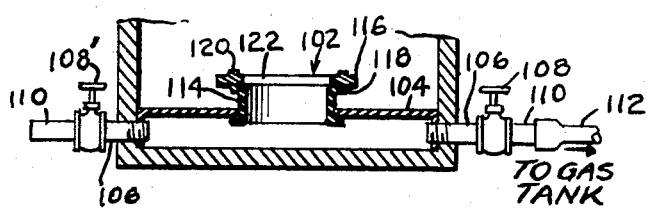
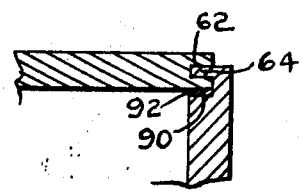
INVENTOR
Charles E. Muñoz
BY Homer R. Montague
ATTORNEY Oct. 26, 1971 C. E. MUNOZ 3,615,159
METHOD AND APPARATUS FOR CHANGING GAS
FITTINGS, METERS AND THE LIKE
Filed Nov. 12, 1968 3 Sheets-Sheet 3
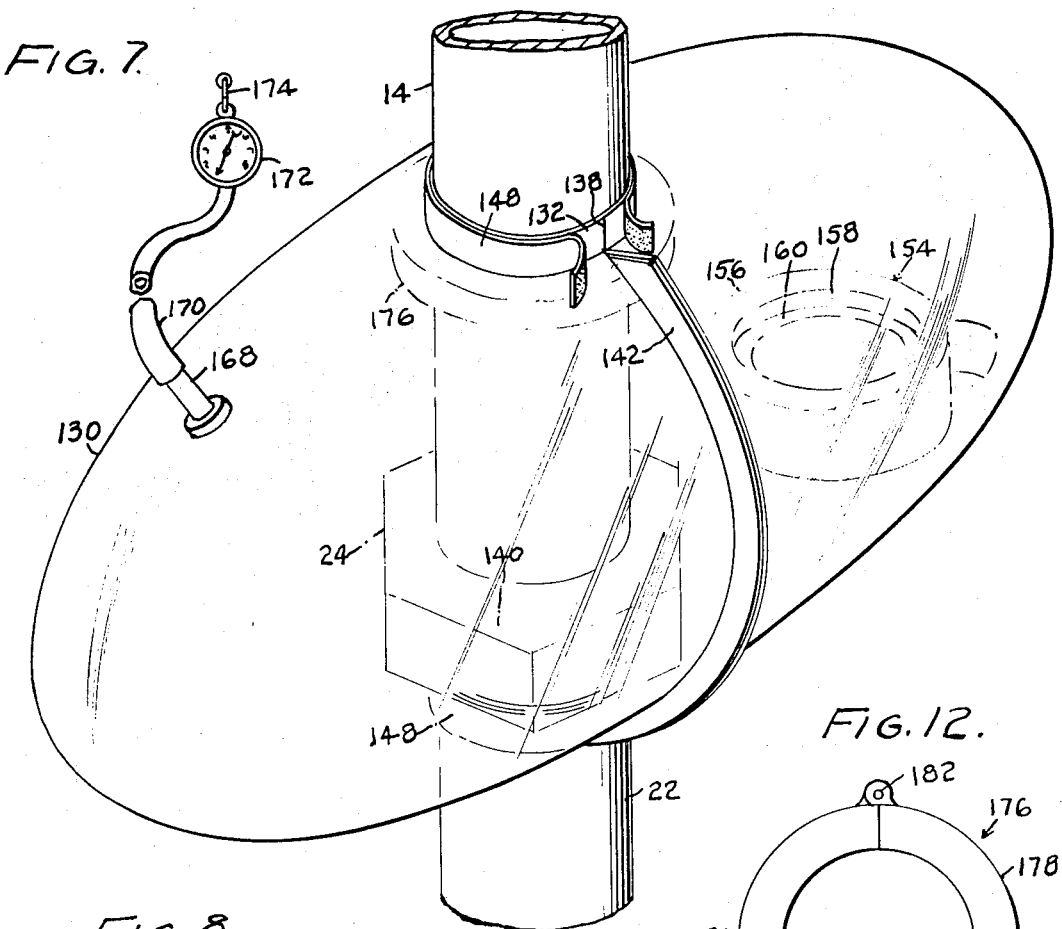
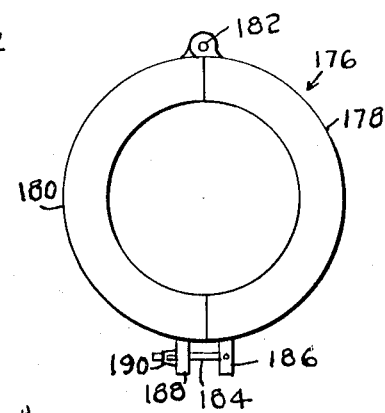
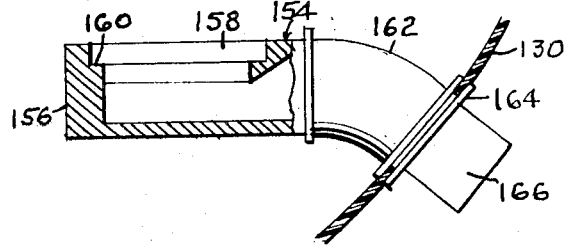
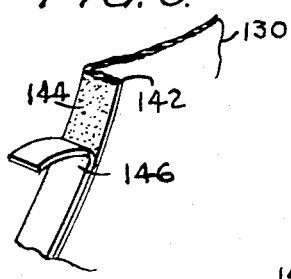
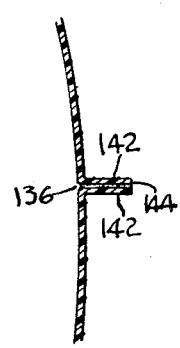
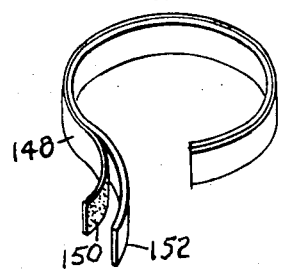
INVENTOR
Charles E. Muñoz
BY Homer R. Montague
ATTORNEY 3,615,159
METHOD AND APPARATUS FOR CHANGING GAS
FITTINGS, METERS AND THE LIKE
Charles E. Muñoz, P.O. Box 17758,
El Paso, Tex. 79917
Filed Nov. 12, 1968, Ser. No. 775,053
Int. Cl. F16l 55/00
U.S. Cl. 285—18                                11 Claims

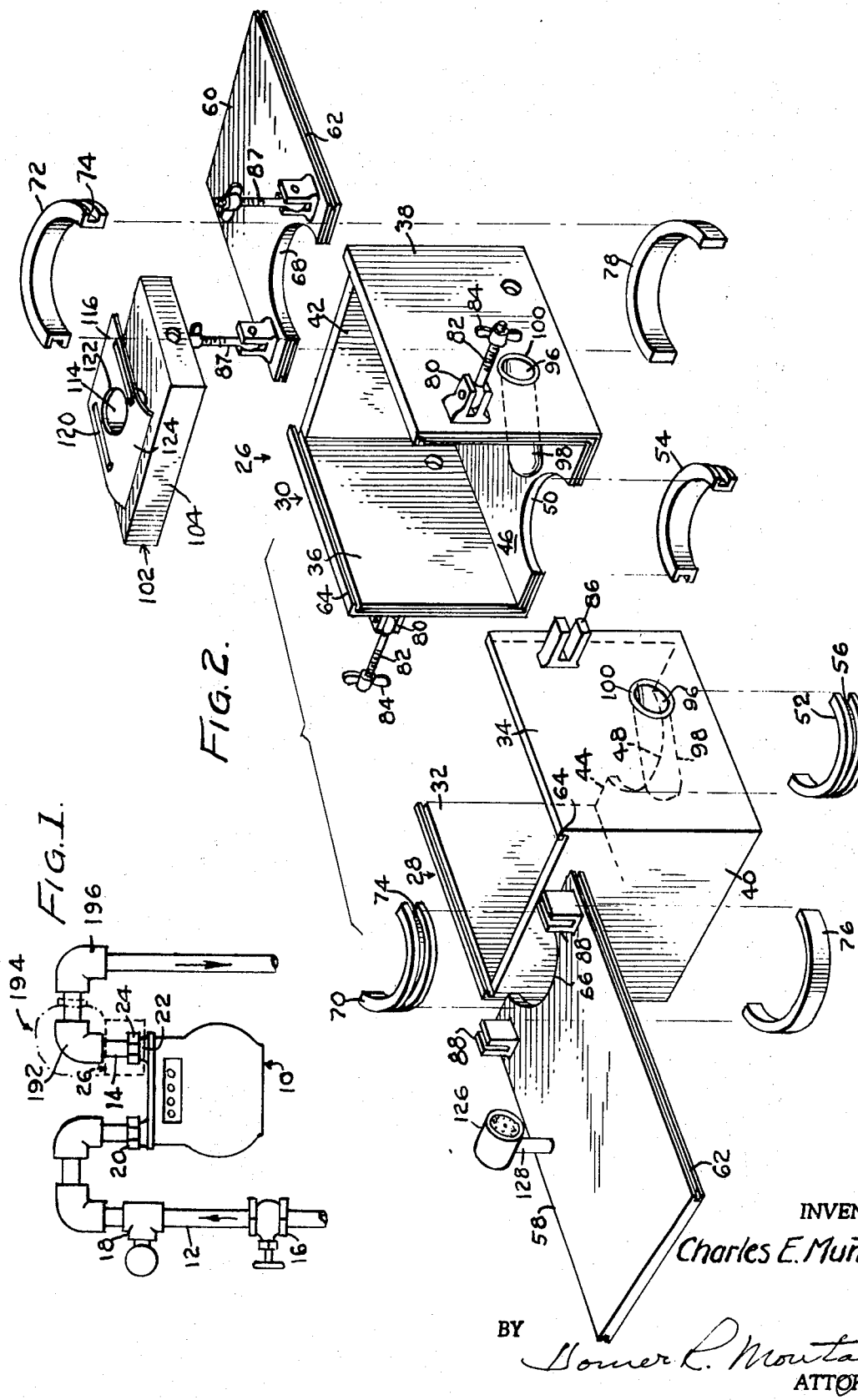

ABSTRACT OF THE DISCLOSURE

To allow removal and replacement of any domestic-type gas meter, or other on-the-line components, without access to premises beyond the meter and without the slightest interruption or significant pressure drop in the gas supply to the premises, and without requiring special fittings in the supply line, a separable or flexible casing is designed to fit about the region of connection between the meter's outlet connection and the house or service gas line. The casing is closed and sealed about this region and purged of air, whereupon the service line is disconnected at its standard coupling and the meter, and a relatively portion of the casing, are moved to bring an auxiliary gas supply into connection with the service line. The casing can then be opened, and the meter, or other component, totally disconnected, and/or replaced, without affecting the gas supply to the premises.

BACKGROUND OF THE INVENTION

There are many reasons for the need to remove gas meters without interrupting service. In the first place, there is a possibility of an erroneous dial recording on the meter, this usually resulting in a complaint from the customer, and the meter must be removed and tested. In the second place, installation of a plastic bushing to insulate the meter from the main gas line is often necessary, to provide proper cathodic protection. Moreover, periodic testing of all meters is required by law in many cities and states, and it is often necessary to change meters that are old, and replace them with new and more modern meters.

It has always been a serious and expensive problem for gas utility companies to disconnect gas meters at their customers' premises without disrupting gas delivery. Under the usual conditions a service crew must first be sure that somebody is at home or on the premises to secure permission to disrupt the gas service. If no one is found at the premises, this involves another call at a later date, with considerable added expense for the utility company. Gas service cannot be disrupted without there being somebody "at home," even when the meter is outside the building, because the operation normally causes all pilot light to go out, and in many cases, gas appliances such as heaters, refrigerators, deep freeze boxes, air conditioning units, and the like, will be put out of service. When the gas service is turned on again after the crew has finished its work, there must be some way to enter the house to re-light all of the pilots of the appliances.

Even if someone is found on the premises and permission is obtained to disconnected the meter, there can still be problems. When gas service is interrupted, the pilot lights are extinguished, and heat is cut off from any associated thermocouple; if the appliance is a few years old, the cooling of the thermocouple may cause a reaction which makes it thereafter inoperative. When the service crew restores gas service, they must then also take the time to replace any thermocouple found to be inoperative.

At the present time there are various known ways of bypassing a gas meter by the use of special device requiring tees or various kinds of fittings to be present in the inlet side of the house service line, or in the meter loop. These devices permit auxiliary gas to be supplied into the house line, as from a portable tank of compressed gas, or even from the street supply. There is another method which can be employed if the meter as originally installed included a bypass across the meter, to be turned on or off as needed. In either such case, the fitting or the bypass device must originally have been installed in the meter loop, otherwise it would still be necessary to disrupt the gas service for its installation. The same problem is encountered by the gas utility company in installing these devices (after service has commenced) as in changing or working on a meter. Also, these methods all involve a permanent fixture of one kind or another to have been installed, adding unnecessarily to the cost of each meter installation.

SUMMARY OF THE INVENTION

The invention overcomes all of the above noted objections and disadvantages, and allows any gas meter to be removed without access to the premises beyond the meter, without the permanent installation of any special fittings or the like, and without the slightest interruption to the service, or percepible pressure drop.

In one form of the invention a box-like casing structure is provided having bottom, end, and side walls and a slidable top, the box body being divided transversely so as to be separable, and the top being similarly divided. The top of the box and the bottom thereof are provided, adjacent the division line, with gaskets adapted to fit around the outlet of the gas meter and around the service line a short distance above the meter. In use, the coupling between these parts is desirably first pre-loosened; when all of the elements described have been brought together around the gas meter outlet connection and around the adjacent part of the service line, the casing is purged of air and pressurized with gas, and the coupling in the service line adjacent the meter is screwed off so that this line may safely be disconnected. Within the casing is arranged a bypass device for supplying gas to the service line from an auxiliary supply of gas (which may be the same source used to purge the casing, as described above).

When the box has been assembled around the service line, the operator inserts a finger and thumb through holes provided with flexible diaphragm covers in the box walls, to further loosen the (pre-loosened) coupling nut and remove it along the service line, into engagement with a permanent magnet mounted in the casing, so as to be held out of the way by the magnet during the remainder of the service operation. After the coupling to the service line at the meter outlet is released, the coupling of the intake side of the meter is loosened to permit the meter to be swung on the axis of the inlet pipe, the outlet of the meter and the service line thus being moved out of alignment with each other, and the bypass device being moved into engagement with the service line so that the latter can be supplied continuously with gas. The meter can then be removed for inspection, replacement, or the like.

The reverse of the foregoing steps is followed when the meter is replaced or a new meter placed in position, the outlet of the meter being inserted through the bottom opening of the split (and partially separated) housing, whereupon the meter is swung back to its normal position, turning about the axis of the inlet pipe, again with purging and re-pressurization after the box-parts close upon one another and are locked together. Final movement of the meter in the same direction, with disengagement of the service pipe from the bypass device, allows re-connection of the meter outlet to the service pipe. The connecting nut is removed from the magnet and screwed onto the meter outlet, the box assembly removed, and the connecting nuts fiinally tightened in place.

3

In a modified form of the invention, basically the same steps are followed. In this case, however, the separable casing is in the form of an impervious and preferably disposable, transparent, flexible plastic bag-like structure divided or split vertically around one entire side, and which can be opened and applied about the service pipe connection fitting, as in the previous case. At the top and bottom of the plastic bag or casing are provided split openings to receive respectively the service line and the outlet connection pipe of the meter, and a bypass device as in the previous case is located in and adjacent one end of the plastic casing. This casing is, in itself, sufficiently flexible so as to be deformed for the unscrewing of the coupling nut at the outlet of the meter, and to allow the operator to move the coupling nut upwardly out of operative position so as to be held by a magnet during the meter changing operation. The openings at the top and bottom of the plastic casing are provided with sealing bands therearound having a mastic or adhesive applied thereto to snugly hold the top and bottom of the bag to the service pipe, to prevent gas leakage. The split side of the casing is provided with a fin type (or similar) seal in the form of flanges projecting laterally from the plastic casing or bag, and the surfaces of these flanges or flaps are also coated with a sealant such as a mastic or non-drying pressure-sensitive adhesive. All of the adhesive or mastic surfaces are initially covered by protecting strips which are peeled off when the mastic coated devices or surfaces are to be used. In replacing the meter, or installing a new meter, the mastic will re-adhere sufficiently for the reversal of the operations, to restore meter service.

BRIEF DESCRIPTION OF THE DRAWINGS

FIG. 1 is a face view on a reduced scale of a gas meter showing its conventional inlet and outlet piping connections, the device forming the subject matter of the present invention being shown in dotted lines at the position it will occupy in use.

FIG. 2 is an exploded perspective view of the various parts of the box-like casing forming one embodiment of the invention.

FIG. 3 is a vertical sectional view of the type of device shown in FIG. 2, the section being taken axially of the gas service pipe and transversely of the meter.

FIG. 4 is a similar view showing the parts in the positions they will occupy after the meter outlet has been disconnected from the service line, and the latter connected to the bypass device.

FIG. 5 is a fragmentary section on line 5—5 of FIG. 4.

FIG. 6 is a fragmentary sectional view on line 6—6 of FIG. 4.

FIG. 7 is a perspective view of a modified form of the invention employing a plastic bag or casing.

FIG. 8 is a detail sectional view showing a form of connection of the bypass device to the plastic bag.

FIG. 9 is a fragmentary perspective view of a portion of one of the fin-type seals, showing the protective strip over the mastic, but partly pulled loose.

FIG. 10 is a sectional view through the fin-type seal.

FIG. 11 is a view similar to FIG. 9 showing the means for sealing the top and bottom of the plastic bag to its associated parts.

FIG. 12 is a plan view of the permanent magnet connection-nut holder used with the modified form of the casing.

DESCRIPTION OF THE PREFERRED EMBODIMENTS

Referring to FIG. 1, the numeral 10 designates a conventional gas meter installation having an inlet pipe 12 and an outlet pipe 14, the latter constituting the service line for the building. The inlet pipe is normally provided with a cut-off valve 16 and a pressure regulating valve 18 of conventional construction. The inlet pipe is connected to the meter by a conventional threaded (swivel) coupling nut 20, while the service line 14 is connected to the outlet 22 of the meter through a similar coupling nut 24. The casing device forming the subject matter of this first form of the invention is shown in its operative position in dotted lines in FIG. 1, and is designated by numeral 26.

It is to be noted that while the pipe connections to the meter are shown as provided with elbows or bends, these are merely representative, and the connections may be straight runs of pipe or in other configurations. In particular, it is to be noted that these pipes do not include any plugged-off T's, or other special fittings or bypass devices, as such are not required for the operation of the devices of the present invention.

Referring now to FIG. 2 of the drawings, the device 26 in this form comprises a pair of separable box-forming or casing elements 28 and 30, these having respective side walls 32, 34 and 36, 38, respective end walls 40, 42, and respective bottom walls 44, 46. These may be formed of metal, gas-proof plastic, or other suitable materials. The adjacent edges of the bottoms 44 and 46 are cut away semi-circularly as at 48 and 50, and when the box halves are brought together, these cutaways cooperate to form a circular opening adapted to fit around the meter outlet 22, as will become apparent. The semi-circular openings 48 and 50 are respectively provided with semi-circular resilient gaskets or grommets 52 and 54, grooved as at 56 to receive the portions of the box bottoms around the cutaways 48 and 50. These gasket elements, when the box elements are asembled, fit snugly around the meter outlet 22 to prevent gas leakage when the device is in use.

The box units 28 and 30 are also provided with slidable metal or plastic top panels 58 and 60, respectively. The longitudinal edges of these tops are provided with grooves 62 (FIG. 6) adapted to receive longitudinal inwardly extending ribs 64 formed on the side walls of the box elements or units.

The top panels 58 and 60 are provided in their adjacent ends with semi-circular cutouts 66 and 68, respectively, similar to the cutouts 48 and 50. These cutouts are adapted to receive the respective semi-circular resilient gasket or grommet elements 70 and 72, externally groved as at 74 to receive the edge portions of the openings 66 and 68. It will be apparent that when these top members are moved together, as in FIGS. 3 and 4, the gasket elements described cooperate to form a leak-proof seal around the service pipe 14.

Two semi-circular permanent magnet elements 76 and 78 are cemented or otherwise secured to the undersides of the top members 58 and 60, where they will surround the ultimate locations of the grommet halves 70 and 72 when the latter are in place. These magnets are provided to support the coupling nut 24 when the latter has been removed from the meter outlet 22, and the meter is to be finally disconnected. This action of the magnets will be described later, and is illustrated in FIG. 4.

Each of the side walls of one of the box elements 28 or 30 is provided with spaced ears or lugs 80 to which are pivotally connected screws 82 having wing nuts 84 threaded thereon. These screws are adapted to be swung between the spaced lugs 86 carried by the other box element, to cooperate therewith in holding the box elements locked in their confronting operative positions as in FIGS. 3 and 4. Similar locking units 87 are carried by one of the tops 58 or 60 and are adapted to engage spaced ear elements 88 carried by the other top member, thus holding together the tops with their grommets in snug sealing engagement around the service pipe 14, also as shown in FIGS. 3 and 4.

It is necessary to form a sealed gas-tight connection between the top members 58 and 60 and the elements of the box units. To this end, the rib 64 (FIG. 6) is formed above a groove 90, the top surface of which is provided with an elongated resilient gasket strip 92 engaging against the bottom of the associated top member. Thus the sides of the box units are sealed against leakage at their top edges. Similarly, the end walls 40 and 42 of the box units are provided with gasket strips 94 (FIGS. 3 and 4) to prevent leakage at those edges, and the facing edges of the top members 60 and 62, lying outside semicircular gaskets 70, and the facing edges of the box units or casing halves 28 and 30, are similarly gasketed or otherwise treated to prevent any gas leakage when the device is fully assembled in place.

To provide for the manipulation of the coupling nut 24 under conditions to be described, each of the side walls 34 and 38 is provided with an opening 96 (FIG. 2), and a loose flexible diaphragm 98 is accessible through each of these openings by a thumb or finger, the diaphragms being secured at their edges to the box walls as by adhesive or by suitable clamp rings 100 (FIG. 2).

A bypass connection device indicated as a whole by numeral 102 is arranged in the casing structure, being shown in the present embodiment as located (FIGS. 3–5) within the lower inner corner of casing unit 30. The bypass unit comprises in effect an open-bottom box or compartment 104 into which pass pipes 106 which may for example be threaded into the box after passing through holes in the casing unit walls. Obviously, the compartment may merely comprise a suitably shaped partition, welded or otherwise secured gas-tight inside the box unit 30. Each of the pipes 106 has a cut-off valve 108, 108' (FIG. 5), and at least one of them has an extended pipe section 110 at its outer end for connection to an auxiliary gas supply, as by a hose 112 leading to a known type of compressed gas tank having the usual shut-off valve and a filling-pressure gauge (pounds pressure) and an outlet gauge and regulator (ounces pressure). Such tanks, not shown, are often provided with a carrying handle and with supporting legs, as well known in the art.

The auxiliary gas supply may, in the alternative, be obtained from the street main, if a convenient connection point is present, at a point ahead of the meter being disconnected and its shutoff valve 16 of FIG. 1.

In any event, the top wall of box or compartment 104 has an opening communicating with a cylindrical flexible tubular section 114 having an upper flange 118 to which is cemented or otherwise bonded an apertured plate 116. The top surface of plate 116 is provided with guide ribs 120 on opposite sides of its aperture 122, for slidably positioning the lower end of the service pipe 14 over the central opening. The margin of the plate 116 extending toward the center of the assembled box structure may be curved downwardly as at 124 to help the end of the service pipe to slide into position, as more fully described below. A gas pressure gauge (ounces of pressure) 126 is mounted as at 128 by a threaded connection to the top panel 58, so as to indicate the pressure inside the device when it has been closed about the meter connection and filled with gas.

METHOD AND OPERATION FOR THE FIRST EMBODIMENT

The top members 58 and 60 having been slid into position over their respective box sections 28 and 30, and the auxiliary gas supply line connected to a pipe 110 (of FIG. 5) but not yet turned on, the meter coupling nut 24 is first loosened with a wrench and then screwed down again with the fingers only, to prepare it for subsequent finger-loosening. The two box parts or casing halves 28 and 30 and associated elements are then assembled in position as suggested by dotted lines in FIG. 1, the grommet elements 52, 54, 70 and 72 being first positioned respectively around the service pipe and the meter outlet (below the loosened swivel nut 24). It will be noted that the top member 58 is substantially longer than top member 60, and this end of the box or casing assembly (end 28) should preferably be toward the front of the meter for the convenient practice of the method, and observation of the gauge 126.

After assembling the two elements of the casing structure around their associated gasketed pipes (14 and 22), the locking devices 82 and 87 are secured by tightening their wing nuts against the sets of ears 86 and 88. The box or casing structure will thus be sealed against gas leakage by the grommets, the sealing strips 92 (FIG. 6) and 94 (FIG. 4), and other seals as described above.

The casing device must now be filled with gas to the required delivery pressure for service. This may be done either by opening the valve 108 (FIG. 5) in the auxiliary gas supply line, or by inserting a finger and thumb in the flexible diaphragms 98 and manipulating coupling 24 to loosen it further and to partly disconnect the outlet of the meter from the service line 14, so that gas can escape into the casing. While the gas is flowing into the casing, the other valve 108' (at the left in FIG. 5) will remain open for the discharge of the air displaced by inflowing gas. When all of the air has been purged from the casing, the valve 108' will be closed to allow pressure to build up in the casing to the desired gauge indication.

When the gauge 126 indicates the proper pressure level has been reached, the operator will complete the unscrewing of the coupling nut 24 by the use of diaphragms 98, and raise the nut to where it will be held out of the way by magnets 76, 78. Unless it has already been done in connection with filling the casing with gas, the tank valve 108 is now opened to supply gas at the proper pressure to the casing, via bypass fitting box 104.

The operator can now loosen the other coupling nut 20 (FIG. 1) about one turn, with a wrench, without loosening it sufficiently to permit the escape of gas. This operation will lower the meter about ⅛ inch, and will allow the meter to be swung horizontally about the axis of coupling 20. The operator now carefully swings the meter in this way, to bring the (right-hand) outlet connection 22 forward (towards himself), the casing top panels 58 and 60 remaining stationary about the service pipe 14, and the casing halves sliding forward beneath the top panels. This causes the casing to move from the position shown in FIG. 3 relative to the top panels, to the position of FIG. 4, and brings the compartment 104 beneath the end of the service pipe 14. Shortly before the completion of this movement, the lower end of the service pipe will engage the curved end 124 of plate 116 to cam it downwardly, the flexibility of tubing section 114 permitting this action.

When the lower end of the service pipe reaches (relatively speaking) a position in alignment with the opening 122, the plate 116 will snap upwardly and the lower end of the service line will engage and seal in, or against, the upper end of the resilient tubular member 114. This provides for the supply of gas direct from the bypass fitting 102 to the service line, so that gas service to the building is not interrupted, there is no pressure change in the line, and no pilot lights will be extinguished. The building will now be served temporarily with gas under regulated pressure from the portable tank referred to above, connected to hose 112. The gas supply from the street to inlet pipe 12 of the meter may now be cut off at valve 16.

The locking devices at the sides (only) of the casing, namely those designated 82, will now be released by loosening the wing nuts and swinging the bolts outward from thet ears 86. The locking devices 87 for the top panels remain in locking condition. The box or main casing halves can now be separated, and the operator will now slide box unit 28 forward, along the underside of top panel 58, releasing the gas pressure within the casing and also releasing the grip of grommets 52, 54 on the meter outlet connection 22. By then fully disconnecting the inlet swivel 20, the whole meter can be dropped and removed for testing and replacement. The front casing half 28 will remain spaced from the rear casing half 30 a few inches, being held by its top panel 58, still locked to top panel 60 about the service pipe 14.

The meter, or another meter, may be placed in operation by simple reversal of the above steps. The meter will be positioned to receive at its inlet connection the swivel nut 20, which will be screwed down loosely by the fingers. The outlet connection of the meter is placed into the operative position relative to (between) the grommeted openings 48 and 50, whereupon the box section 28 will be moved back to position the grommets 54 and 52 nearly, but not quite, sealed about the meter outlet 22. The swivel nut 20 may then be further tightened, and the house supply valve 16 opened to supply gas through the meter to the interior of the casing, thereby to purge the air from the casing (the air escaping from the not-quite-sealed casing). The casing halves are then closed tight, and the side locks 82 fastened.

Gas pressure will now build up in the casing. When the final proper gauge reading is reached, the operator will insert a finger into the rearwardly positioned diaphragm 98, and depress the plate 116, thus disconnecting it (and the flexible tube 114) from the lower end of the service pipe. The meter is then swivelled (rearwardly) into final position to place the outlet of the meter in alignment with the service pipe, the casing halves 28 and 30 sliding rearwardly along the under sides of the top panels 58 and 60.

The operator's fingers can now release the coupling or swivel nut 24 from the magnets 76, 78, and the nut is dropped downwardly and finger-threaded onto the upper end of the meter's outlet connection 22. The auxiliary supply of gas is now turned off at valve 108, whereupon the casing may be completely removed by opening all of the locking devices 82 and 87 and separating the two box sections (and their top panels) from the meter and pipe 14. The couplings 20 and 24 are then tightened fully with a wrench, whereupon the normal gas supply service to the building will have been restored, without any interruption in flow or pressure.

SECOND EMBODIMENT

FIGS. 7 through 12 illustrate a further embodiment of the invention wherein a flexible plastic bag type of "casing" is substituted for the rigid box elements described above. These bags can be manufactured at very low cost, and may be reused or disposed of after one use, depending upon the materials used, the conditions of use, number of installations being serviced in a day or shift, and so on. Referring first to FIG. 7, the flexible casing, which is made of gas-impervious plastic such as nylon, polyethylene or the like, preferably transparent, is designated by numeral 130; it may have any desired shape, an oval form being illustrated by way of example, although the material is normally quite thin, and the bag fairly shapeless until it is distended by internal pressure.

The casing 130 is provided, above and below, with circular holes surrounded by split circular flanges 132, and the casing itself is split vertically at one side as indicated by numeral 136 in FIG. 10, this vertical slit being a continuation of the splits in the circular flanges. The casing can therefore be distorted and opened up to allow it to be placed around, and encompassing, the region of the connection 24 between the meter outlet 22 and the lower end of the service pipe 14.

The body of the casing 130 at the split therein is formed with outstanding flaps or flanges 142 (FIGS. 1 and 10), the inner surfaces of which are coated with a mastic, or non-drying pressure-sensitive adhesive, covered by a strippable protecting strip 146 (FIG. 9) prior to installation. After the casing has been placed around the pipe 14 and meter connection 22, the strips 146 are pulled away, and the flaps or flanges 142 sealed against one another in a gas tight manner. Either a fin-type seal (as shown), or a simple overlap may of course be employed, depending upon the design of the casing. Around each of the circular flanges 132, or forming a part thereof, is arranged a plastic band 148 similarly coated with mastic or adhesive and having a protective strip 152 (FIG. 11). When the pipe 14 and connection 22 are to be sealed, the protective strip 152 is peeled away and the band, or the flange itself, pulled tightly around the associated pipe and overlapped to bind the flange tightly in place.

One end portion of the plastic casing 130, preferably the end which will be rearward of the meter during use, is provided with an opening to receive the gas conduit of a bypass supply unit 154, comprising for example a ring-like body 156 having an opening 158 in its top, shouldered as at 160 (FIG. 8). The lower end of the service pipe 14 is adapted to seat and seal upon the shoulder 160. To retain the bypass device on the end of the pipe 14 when it has been applied thereto, and in view of the flexibility of the bag material, fitting 154 may be molded of resilient plastic or rubber material, and the opening 158 dimensioned to grip the end of the pipe. Alternatively, a friction ring or the like may be incorporated in opening 158 for this purpose. The bypass device also has the extending supply neck or conduit 162 sealed by flanges 164 (or a mastic-coated grommet or the like) to the casing 130, and projecting beyond the casing as at 166 for connection to an auxiliary gas supply tank (not shown) of the kind already described in connection with the first embodiment of the invention.

At any suitable point, preferably forward of the middle of the casing, a fitting 168 is provided communicating with the interior of the casing and adapted for connection at its outer end to a pressure gauge 172 by a hose 170. The gauge may conveniently be supported by a suitable hook 174 secured at any suitable place for gauge observation. These parts can be re-used indefinitely, like the bypass device 154, simply by connecting and sealing them to a new plastic casing bag or body.

The magnet 176 in this embodiment is a separate piece, having semi-circular sections 178 and 180 connected at hinge 182 (FIG. 12) and a locking device comprising pivot ears 186, a bolt 184 pivoted thereon and extending, when desired, between locking ears 188 or portion 180, and a wing nut 190 threaded on the bolt. The magnet may be clamped about the service pipe 14, above the coupling nut 24 (see FIG. 1) before the bag is applied, or it may be installed through the opening in the bag before the latter is sealed up in place.

OPERATION WITH THE SECOND EMBODIMENT

The steps in the use of this modified form of the invention are in general quite similar to those described above. The operator will loosen the coupling nut 24 initially with a wrench, so that it may later be turned by the operator's fingers. With the magnet clamped in place as in FIG. 7, the casing bag 130, with bypass device 154 and gauge connection 168 installed, will be opened along its slit side, and applied around the service pipe 14 (above the magnet) and meter outlet 22. The protective strips 146 and 152 are removed from their associated adhesive-coated surfaces, and the flanges 142 sealed together, and the strips 148 will be wound tightly around the flanges 132 to effect tight sealing thereof to the respective pipes 14 and 22.

The casing 130 is quite flexible, so the operator may distort its wall sufficiently to grasp the coupling 24 with his fingers, removing it from connection 22 and raising it up for engagement by the magnet 176. Gas is allowed to flow into the casing from the auxiliary tank (or from a street supply if used) until all air is purged from casing (through fitting 168), and the latter is then connected to the gauge hose 170 and the admission of gas continued until the proper gauge reading is registered.

The inlet coupling 20 (FIG. 1) will now be loosened about one turn, and the meter will be swung forward on the axis of that coupling to move the bypass fitting 154 approximately beneath the exposed end of the pipe 14. The flexibility of the casing permits this to be done easily, and the fitting is seated and secured upon the inlet pipe, to continue gas supply to the service line, and the building, from the auxiliary tank (or street supply, if used). The house shut-off valve 16 is now closed.

The lower portion of sealing flanges 142 may then be pulled apart, and the lower strip 148 removed to loosen the lower spilt-circular flange 132 from the outlet connection 22, whereupon the casing may be opened sufficiently to allow the removal of the meter outlet 22 downwardly from the casing. The meter-inlet swivel nut 20 is then completely unthreaded from the meter, whereupon the meter as a whole may be removed for testing, adjustment or replacement.

The meter, or a substitute meter, will be installed by reversing the previous steps. The meter inlet will be connected to the inlet pipe 12 by screwing the coupling nut 20 down finger-tight. The meter outlet 22 will then be swung up through the gap in the lower portion of the bag or casing 130, and the seals re-sealed. The non-drying adhesive or mastic retains its stickiness sufficiently for this re-sealing to be effective. The gauge hose 170 is disconnected, and the shutoff valve 16 opened to purge the air from the casing by gas admitted through the meter. The gauge hose can then be reconnected, and when the prescribed pressure is reached within the bag, the operator can remove the bypass fitting 154 from the end of the service pipe (by manipulating through the flexible walls of the casing). The meter can then be swung (rearwardly) to align the service pipe and the meter outlet, and the coupling 24 is dislodged from the magnet 176 and tightened onto the meter outlet connection. Removal of the casing bag and the magnet, and final tightening of the swivel coupling nuts, completes the operation.

If the casing bag is not to be re-used, the fittings are salvaged for assembly to a new bag body. Obviously, for ready assembly, these fittings may be made with threaded clamping flanges to engage the bag material around the edges of the openings provided for such fittings, and a variety of other and equivalent constructions will readily occur to those familiar with plastic bag fabrication.

From all of the foregoing, it will be apparent that the invention provides ways and means for the disconnection and/or removal of a gas meter from an operating installation without any interruption to gas flow or pressure levels, and which ways and means are applicable to any installation of a meter having only the usual connections, regardless of the presence or absence of plugged Ts or other special fittings in the original installation. Moreover, the invention accomplishes this end with apparatus or equipment which can be operated very rapidly by a worker or crew, thus reducing the cost of such operations in terms of time required, besides making it unnecessary to ensure that the premises may be entered. Other advantages of the inventive concept and its implementation will become obvious to those skilled in the art.

A typical such collateral advantage, particularly with reference to the form of the invention employing a plastic bag, lies in its use in the mere replacement of a portion of the line, such as the installation of a pipe or nipple incorporating a non-conductive bushing or section, as for protection against electrolytic corrosion. Referring again to FIG. 1 of the drawings, it might be desired to remove and replace the nipple section (14) between the meter outlet connection 22 and the elbow (or similar fitting) 192. In this case, a bag indicated by the numeral 194 is provided, in all respects similar to bag 130 but of ample size to extend from beneath the swivel nut 24 (around meter connection 22), upward so as to enclose the nipple section at 14 as well as the elbow 192. The lower circular opening of the bag (148 in FIG. 7) would again be sealable around the meter outlet 22, and the slit bag would extend around the elbow 192 and be sealed at its other circular opening around the nipple extending from elbow 192 to the next elbow 196, for example.

In such a case, the swivel nut 24 is initially loosened, and the bag 194 installed as just described, the bag being provided with the bypass fitting and pressure gauge connection as before. When the bag has been purged and filled with gas under pressure as earlier described, and fully sealed, the swivel nut is removed and secured to the magnetic ring, the meter is pulled forward, and the bypass fitting connected to the house line nipple 14, to supply the house from the auxiliary supply. The bottom of the bag, around the meter outlet, can then be loosened, and the gas valve 16 shut off. The lateral seam of the bag is then parted enough to provide access to the swivel pipe 14, and a small wrench (if needed) employed to loosen the swivel pipe enough for later removal by hand. The replacement nipple (e.g., with its insulating section) is thread-doped, and laid in the bag, which is then purged by opening valve 16 and filling it with gas under pressure, and re-sealed.

The operator may now safely remove the bypass fitting from the old swivel pipe 14, remove the swivel pipe by hand manipulation (laying it loose in the bag), and similarly insert the new swivel pipe in the ell 192 or other fitting. The magnet 176 and nut 24 are transferred to the new swivel pipe. The meter can then be swung back into place (with its outlet under the end of the new swivel pipe) and the swivel nut 24 hand-tightened onto meter connection 22. The house service line is now again being supplied with gas from the inlet pipe 12, and the bag can be removed and both swivel nuts finally tightened with a wrench.

Obviously, under some circumstances, it will not be necessary to open the bag to use a wrench on the old swivel pipe 14; for example, where it can be loosened enough prior to installing the bag. If so, the new fitting can be put into the bag before it is first sealed around the work area, and when the well-loosened old swivel pipe is removed, after having swung the meter forward, the magnet and nut can be transferred, and the new swivel pipe installed, without opening the bag seam and without the need for using the auxiliary gas bypass connection 154.

While I have disclosed the invention in connection with the best modes presently known to me far carrying it into practice, many of the details specified and described above are subject to variation without departing from the inventive concept. I therefore do not intend the descriptions in a limiting sense, but desire to cover the invention and all such variations thereof as fall within the scope of the appended claims.

What is claimed is:

1. Apparatus for disconnecting from service a gas meter having an inlet connection and an outlet connection, a service line, and a coupling connecting the outlet connection to said service line, comprising a casing having openings at the top and bottom thereof adapted to surround in snug engagement therewith said outlet connection and said service line to form leak-proof joints, means for filling said casing with gas under pressure, and a bypass auxiliary gas supply fitting in said casing and adapted to be brought into direct sealing communication with the end of said service line, when said coupling has been uncoupled, whereby the casing may thereafter be opened for removal of the meter without interrupting the gas supply to said service line.

2. Apparatus according to claim 1, wherein said casing is constructed to provide manual access to said coupling to permit its removal from said outlet connection.

3. Apparatus according to claim 1, including a permanent magnet mounted within said casing above said outlet connection, to support said coupling out of the way during movement of said bypass device.

4. Apparatus according to claim 1, wherein said casing is constructed to provide manual access to said coupling to remove the latter from the meter outlet connection, and a permanent magnet within said casing to engage and support said coupling away from the meter outlet connection.

5. Apparatus in accordance with claim 1, wherein said casing is in the form of a structure divided transversely to form box-like sections, said sections being provided with top and bottom walls each of which has semi-circular cutouts to fit respectively around said outlet connection and said service line when said casing sections are brought together.

6. Apparatus in accordance with claim 5 in which said cutouts are provided with sealing gasket elements coacting to seal about said outlet connection and said service line.

7. Apparatus according to claim 5 wherein said box-like sections are slidable relative to their top walls to permit moving said bypass device into engagement with said service line.

8. Apparatus according to claim 1 wherein said casing is in the form of a flexible plastic bag.

9. Apparatus according to claim 1 wherein said casing comprises a flexible plastic bag split around one semi-circumferential path connecting said openings.

10. Apparatus according to claim 9, and adhesive sealing means associated with the edges of said split and the peripheries of said openings.

11. The method of disconnecting a gas line component, meter or the like from its connection with a service line without interruption of gas pressure in the latter, comprising surrounding the region of said connection with a sealed casing, filling said casing with gas under pressure, separating said connection within said casing, essentially by a relative motion of its parts in a direction lateral to the axis of the service line, supplying gas under pressure from an auxiliary source to a bypass supply fitting within the casing, reconnecting the separated end of said service line directly to said bypass fitting, and thereafter opening said casing to allow removal of said meter or line component without disturbing the flow of gas into the service line.

References Cited
UNITED STATES PATENTS

| | | | |
|---|---|---|---|
| 3,122,158 | 2/1964 | Grunsky | 285—18 X |
| 3,148,690 | 9/1964 | Petersen | 285—18 X |
| 3,310,322 | 3/1967 | Carroll | 285—18 |

THOMAS F. CALLAGHAN, Primary Examiner

U.S. Cl. X.R.

137—15